United States Patent
Zhang et al.

(10) Patent No.: US 11,283,778 B2
(45) Date of Patent: Mar. 22, 2022

(54) DATA EXCHANGE SYSTEM, METHOD AND DEVICE

(71) Applicants: Beijing Jingdong Shangke Information Technology Co., Ltd., Beijing (CN); Beijing Jingdong Century Trading Co., Ltd., Beijing (CN)

(72) Inventors: Zhenting Zhang, Beijing (CN); Yihong Zhao, Beijing (CN); Xiao Wang, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 143 days.

(21) Appl. No.: 16/603,232

(22) PCT Filed: Apr. 17, 2018

(86) PCT No.: PCT/CN2018/083375
§ 371 (c)(1),
(2) Date: Oct. 6, 2019

(87) PCT Pub. No.: WO2018/223777
PCT Pub. Date: Dec. 13, 2018

(65) Prior Publication Data
US 2020/0374272 A1    Nov. 26, 2020

(30) Foreign Application Priority Data

Jun. 6, 2017   (CN) .......................... 201710418271.2

(51) Int. Cl.
*H04L 29/06*   (2006.01)
*G06F 21/60*   (2013.01)
(Continued)

(52) U.S. Cl.
CPC ........ *H04L 63/0435* (2013.01); *G06F 21/602* (2013.01); *H04L 9/0618* (2013.01); *H04L 9/0819* (2013.01); *H04L 9/16* (2013.01)

(58) Field of Classification Search
CPC . H04L 63/0435; H04L 9/0618; H04L 9/0819; H04L 9/16; H04L 67/1078; G06F 21/602
See application file for complete search history.

(56) References Cited

U.S. PATENT DOCUMENTS 5,884,325 A    3/1999  Bauer et al.
6,092,196 A *  7/2000  Reiche .................... G06F 21/41
                                                      705/52
(Continued)

FOREIGN PATENT DOCUMENTS

CN    101047610 A    10/2007
CN    102111411 A    6/2011
(Continued)

OTHER PUBLICATIONS

International Search Report and Written Opinion for PCT/CN2018/083375, dated Jun. 27, 2018, 3 pages.

*Primary Examiner* — Cheng-Feng Huang
(74) *Attorney, Agent, or Firm* — Blank Rome LLP

(57) ABSTRACT

The present application discloses a data exchange system, method, and device. The system comprises a first server configured to acquire a to-be-exchanged data identifier based on requirement information; store the to-be-exchanged data identifier; acquire a storage address of the to-be-exchanged data identifier; and encrypt the storage address of the to-be-exchanged data identifier to generate a first encrypted storage address; and a second server configured to acquire the first encrypted storage address from the first server; decrypt the first encrypted storage address to acquire the storage address of the to-be-exchanged data identifier; acquire the to-be-exchanged data identifier based (Continued)

on the storage address of the to-be-exchanged data identifier; and find to-be-exchanged data indicated by the to-be-exchanged data identifier from a pre-stored data set based on the to-be-exchanged data identifier, such that the first server acquires the to-be-exchanged data from the second server, the data set including data and a data identifier.

20 Claims, 4 Drawing Sheets

(51) Int. Cl.
H04L 9/06 (2006.01)
H04L 9/08 (2006.01)
H04L 9/16 (2006.01)

(56) References Cited

U.S. PATENT DOCUMENTS

| | | | | |
|---|---|---|---|---|
| 7,610,627 B1* | 10/2009 | McKenna | ............ | G06F 21/6254 726/26 |
| 9,075,973 B2* | 7/2015 | Chabanne | ............ | G06F 21/6245 |
| 9,311,499 B2* | 4/2016 | Redlich | ............... | G06F 21/6209 |
| 2010/0174919 A1* | 7/2010 | Ito | .......................... | G06F 21/554 713/192 |
| 2011/0271093 A1* | 11/2011 | McKenna | ............ | G06F 21/6263 713/150 |
| 2012/0239940 A1* | 9/2012 | Chabanne | ............... | G06F 21/32 713/186 |
| 2014/0052989 A1* | 2/2014 | Jones | ....................... | G06F 21/85 713/171 |
| 2014/0095889 A1* | 4/2014 | Araki | .................... | H04L 9/0894 713/189 |
| 2014/0359276 A1* | 12/2014 | Resch | ................... | H04L 63/061 713/153 |
| 2015/0039888 A1* | 2/2015 | Barrus | ....................... | H04L 9/14 713/168 |
| 2015/0180847 A1* | 6/2015 | Nix | ..................... | H04L 63/0435 713/168 |
| 2015/0341348 A1* | 11/2015 | Yang | ....................... | G06F 21/34 726/7 |
| 2016/0004646 A1* | 1/2016 | Maeda | ................ | G06F 12/0238 713/193 |
| 2017/0330143 A1* | 11/2017 | Raghavan | ............. | G06F 40/106 |
| 2018/0183768 A1* | 6/2018 | Lobban | ................ | H04L 63/0442 |
| 2021/0233171 A1* | 7/2021 | Crumb | ................... | G06Q 30/04 |

FOREIGN PATENT DOCUMENTS

| | | |
|---|---|---|
| CN | 103107889 A | 5/2013 |
| CN | 103810197 A | 5/2014 |
| CN | 107248984 A | 10/2017 |

* cited by examiner

DATA EXCHANGE SYSTEM, METHOD AND DEVICE

CROSS-REFERENCE TO RELATED APPLICATIONS

This patent application is a national stage of International Application No. PCT/CN2018/083375, filed on Apr. 17, 2018, which claims priority to Chinese Patent Application No. 201710418271.2, filed on Jun. 6, 2017. The contents of those applications are incorporated herein by reference in their entireties.

TECHNICAL FIELD

The present disclosure relates to the field of computer technology, specifically to the field of Internet technology, and more specifically to a system, method and apparatus for data exchange.

BACKGROUND

With the advent of the era of big data, data exchange and sharing have become increasingly important. The existing system for data exchange is generally provided with a data exchange center. During data exchange in the system for data exchange, the data exchange center performs operations, such as recording, maintenance or the like, for the exchange process.

However, in the system for data exchange provided with the data exchange center, all data exchange processes need to be supported by the data exchange center, resulting in high construction and maintenance costs of the system for data exchange.

SUMMARY

An objective of the present disclosure is to provide an improved system, method, and apparatus for data exchange, to solve the technical problems mentioned in the Background part.

In a first aspect, an embodiment of the present disclosure provides a system for data exchange, including a first server and a second server. The first server is configured to acquire a to-be-exchanged data identifier based on requirement information; store the to-be-exchanged data identifier; acquire a storage address of the to-be-exchanged data identifier; and encrypt the storage address of the to-be-exchanged data identifier to generate a first encrypted storage address. The second server is configured to acquire the first encrypted storage address from the first server; decrypt the first encrypted storage address to acquire the storage address of the to-be-exchanged data identifier; acquire the to-be-exchanged data identifier based on the storage address of the to-be-exchanged data identifier; and find to-be-exchanged data indicated by the to-be-exchanged data identifier from a pre-stored data set based on the to-be-exchanged data identifier, such that the first server acquires the to-be-exchanged data from the second server. The data set includes data and a data identifier.

In some embodiments, the second server is further configured to: store the to-be-exchanged data; acquire a storage address of the to-be-exchanged data; and encrypt the storage address of the to-be-exchanged data to generate a second encrypted storage address; and the first server is further configured to: acquire the second encrypted storage address from the second server; decrypt the second encrypted storage address to acquire the storage address of the to-be-exchanged data; and acquire the to-be-exchanged data based on the storage address of the to-be-exchanged data.

In some embodiments, the first server is further configured to: generate a symmetric key; encrypt the storage address of the to-be-exchanged data identifier with the symmetric key, to generate a first ciphertext; and map the first ciphertext to the first encrypted storage address based on a preset corresponding relationship.

In some embodiments, the first server is further configured to: encrypt the symmetric key with a public key pre-acquired from the second server, to generate an encrypted symmetric key, where the second server stores the public key and a private key corresponding to the public key.

In some embodiments, the second server is further configured to: acquire the encrypted symmetric key and the first encrypted storage address from the first server; decrypt the encrypted symmetric key with the private key corresponding to the public key, to acquire the symmetric key; and decrypt the first encrypted storage address with the symmetric key and the preset corresponding relationship, to acquire the storage address of the to-be-exchanged data identifier.

In some embodiments, the second server is further configured to: encrypt the storage address of the to-be-exchanged data with the symmetric key, to generate a second ciphertext; and map the second ciphertext to the second encrypted storage address based on the preset corresponding relationship.

In some embodiments, the first server is further configured to: acquire the second encrypted storage address from the second server; decrypt the second encrypted storage address with the symmetric key and the preset corresponding relationship, to acquire the storage address of the to-be-exchanged data; and acquire the to-be-exchanged data based on the storage address of the to-be-exchanged data.

In some embodiments, the first server is further configured to: enclose a resource corresponding to the to-be-exchanged data; and release the resource corresponding to the to-be-exchanged data after receiving the to-be-exchanged data sent by the second server, such that the second server acquires the resource corresponding to the to-be-exchanged data.

In a second aspect, an embodiment of the present disclosure provides a method for data exchange for a first server, including: acquiring a to-be-exchanged data identifier based on requirement information; storing the to-be-exchanged data identifier; acquiring a storage address of the to-be-exchanged data identifier; encrypting the storage address of the to-be-exchanged data identifier to generate a first encrypted storage address, such that a second server acquires the first encrypted storage address from the first server, decrypts the first encrypted storage address to acquire the storage address of the to-be-exchanged data identifier, acquires the to-be-exchanged data identifier based on the storage address of the to-be-exchanged data identifier, and finds to-be-exchanged data indicated by the to-be-exchanged data identifier from a pre-stored data set based on the to-be-exchanged data identifier, the data set including data and a data identifier; and acquiring the to-be-exchanged data from the second server.

In a third aspect, an embodiment of the present disclosure provides an apparatus for data exchange for a first server, including: a first acquiring unit, configured to acquire a to-be-exchanged data identifier based on requirement information; a storing unit, configured to store the to-be-exchanged data identifier; a second acquiring unit, configured to acquire a storage address of the to-be-exchanged data identifier; an encrypting unit, configured to encrypt the storage address of the to-be-exchanged data identifier to generate a first encrypted storage address, such that a second server acquires the first encrypted storage address from the first server, decrypts the first encrypted storage address to acquire the storage address of the to-be-exchanged data identifier, acquires the to-be-exchanged data identifier based on the storage address of the to-be-exchanged data identifier, and finds to-be-exchanged data indicated by the to-be-exchanged data identifier from a pre-stored data set based on the to-be-exchanged data identifier, the data set including data and a data identifier; and a third acquiring unit, configured to acquire the to-be-exchanged data from the second server.

In a fourth aspect, an embodiment of the present disclosure provides a server, including: one or more processors; and a storage apparatus, configured to store one or more programs, where the one or more programs, when executed by the one or more processors, cause the one or more processors to implement the method according to the implementation in the second aspect.

In a fifth aspect, an embodiment of the present disclosure provides a computer readable storage medium, storing a computer program thereon, where the computer program, when executed by a processor, implements the method according to the implementation in the second aspect.

In the system, method, and apparatus provided in the embodiments of the present disclosure, first, a first server acquires a to-be-exchanged data identifier based on requirement information, and stores the to-be-exchanged data identifier; then the first server encrypts a storage address of the to-be-exchanged data identifier to generate a first encrypted storage address; then a second server acquires the first encrypted storage address from the first server, and decrypts the first encrypted storage address to acquire the storage address of the to-be-exchanged data identifier; then, the second server acquires the to-be-exchanged data identifier based on the storage address of the to-be-exchanged data identifier; and finally the second server finds to-be-exchanged data indicated by the to-be-exchanged data identifier from a pre-stored data set based on the to-be-exchanged data identifier, such that the first server acquires the to-be-exchanged data from the second server. The system for data exchange avoids using a data exchange center by direct peer-to-peer data exchange between the first server and the second server, thereby saving construction and maintenance costs of the system for data exchange.

BRIEF DESCRIPTION OF THE DRAWINGS

By reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
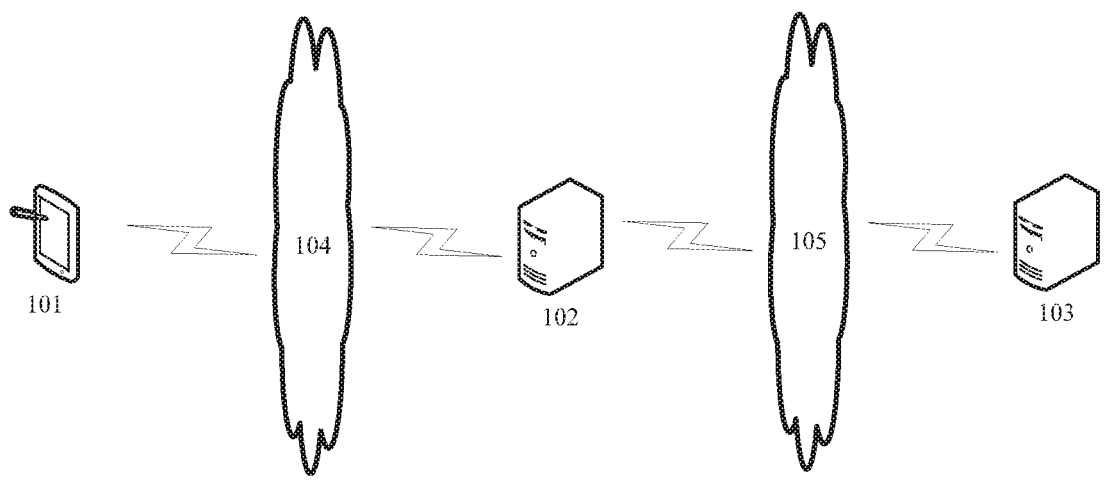
FIG. 1 is a diagram of an exemplary system architecture of a system for data exchange according to an embodiment of the present disclosure.

FIG. 1 shows an exemplary system architecture 100 of a system for data exchange according to an embodiment of the present disclosure.

As shown in FIG. 1, the system architecture 100 may include a terminal device 101, a first server 102, a second server 103, and networks 104 and 105. The network 104 serves as a medium providing a communication link between the terminal device 101 and the first server 102. The network 105 serves as a medium providing a communication link between the first server 102 and the second server 103. The networks 104 and 105 may include various types of connections, such as wired or wireless communication links, or optical fibers.

The terminal device 101 may interact with the first server 102 via the network 104, to receive or send messages, etc. For example, the terminal device 101 may send requirement information to the first server 102 via the network 104. The terminal device 101 may be various electronic devices, including but not limited to a smart phone, a tablet computer, a laptop portable computer, a desktop computer, or the like.

The first server 102 may interact with the second server 103 via the network 105, to receive or send messages, etc. For example, the first server 102 can store to-be-exchanged data identifier, and send a first encrypted storage address (an encrypted storage address of a to-be-exchanged data identifier) to the second server 103 via the network 105; the second server 103 can first process, e.g., analyze, the first encrypted storage address to acquire the to-be-exchanged data identifier; then find to-be-exchanged data from a pre-stored data set based on the to-be-exchanged data identifier, and send the to-be-exchanged data to the first server 102 via the network 105.

It should be noted that the method for data exchange for a first server provided in the embodiment of the present disclosure is generally executed by the first server 102, and accordingly, the apparatus for data exchange for a first server is generally provided in the first server 102.

It should be understood that the numbers of terminal devices, first servers, second servers, and networks in FIG. 1 are merely illustrative. Any number of terminal devices, first servers, second servers, and networks may be provided based on actual requirements.

Figure 2:
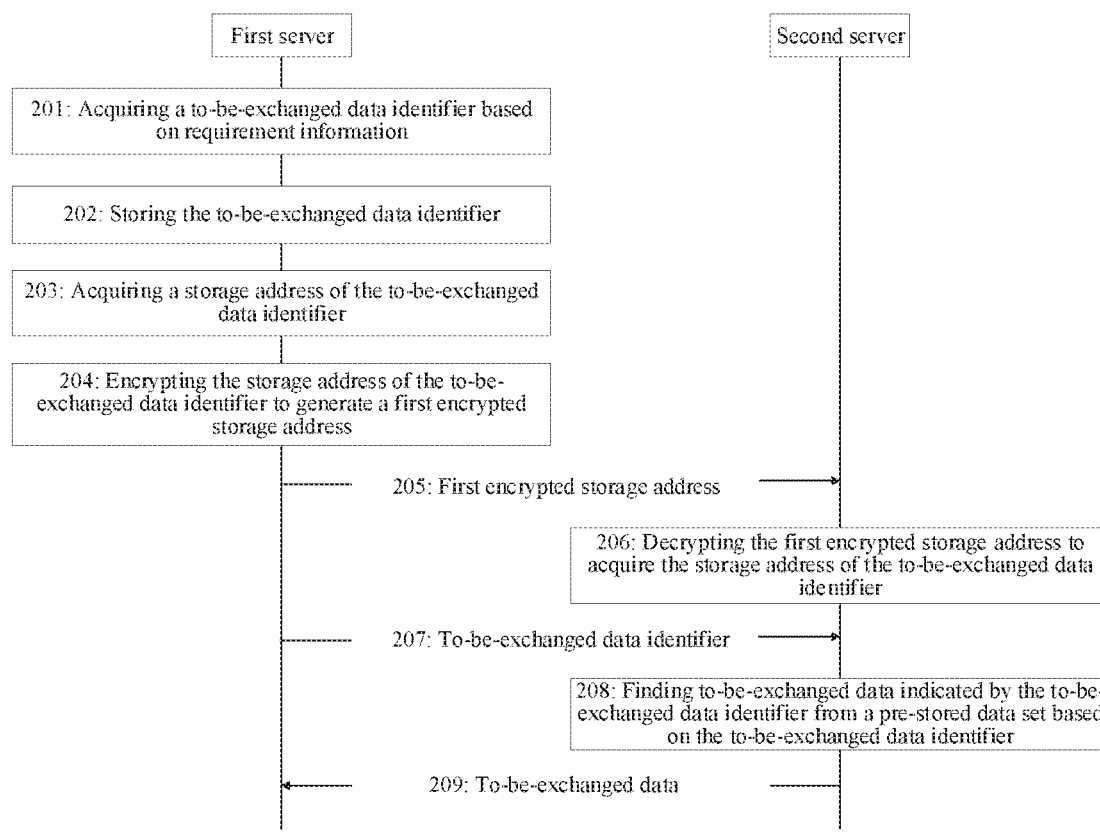
FIG. 2 is a timing sequence diagram of an embodiment of the system for data exchange according to the present disclosure.

Further referring to FIG. 2, a timing sequence 200 of an embodiment of the system for data exchange according to the present disclosure is shown.

The system for data exchange of the present embodiment may include a first server (e.g., the first server 102 shown in FIG. 1) and a second server (e.g., the second server 103 shown in FIG. 1). The first server is configured to acquire a to-be-exchanged data identifier based on requirement information; store the to-be-exchanged data identifier; acquire a storage address of the to-be-exchanged data identifier; and encrypt the storage address of the to-be-exchanged data identifier to generate a first encrypted storage address. The second server is configured to acquire the first encrypted storage address from the first server; decrypt the first encrypted storage address to acquire the storage address of the to-be-exchanged data identifier; acquire the to-be-exchanged data identifier based on the storage address of the to-be-exchanged data identifier; and find to-be-exchanged data indicated by the to-be-exchanged data identifier from a pre-stored data set based on the to-be-exchanged data identifier. The first server acquires the to-be-exchanged data from the second server, the data set including data and a data identifier.

As shown in FIG. 2, in step 201, the first server acquires a to-be-exchanged data identifier based on requirement information.

In the present embodiment, the first server (e.g., the first server 102 shown in FIG. 1) can acquire the requirement information from a client (e.g., the terminal device 101 shown in FIG. 1) via a wired or wireless connection, and extract the to-be-exchanged data identifier from the requirement information. The requirement information may include the to-be-exchanged data identifier. The data identifier may be comprised of words, letters, numerals, symbols, etc., to uniquely identify data. The to-be-exchanged data identifier can be used to uniquely identify to-be-exchanged data. As an example, the data identifier may include at least one of a data name or a data index.

In the present embodiment, a second server (e.g., the second server 103 shown in FIG. 1) can pre-issue data identifiers of exchangeable data stored in the second server. A user can view these data identifiers, and find the to-be-exchanged data identifier from the data identifier based on his own needs. Then, the user can send the requirement information including the to-be-exchanged data identifier to the first server. Finally, the first server can analyze the requirement information to extract the to-be-exchanged data identifier therefrom.

Here, the second server can issue the data identifiers in various ways. For example, the second server can write the data identifiers into a smart contract, and issue the smart contract. Thus, the user can view the smart contract, and find the to-be-exchanged data identifier from the smart contract based on his own needs. The smart contract is a set of promises defined in a digital form, including an agreement on which contract participants (e.g., the first server and the second server) can perform these promises. The smart contract is essentially an executable computer code, and its working principle is similar to an if-then statement of other computer programs. The smart contract only interacts with real-world assets in this way. When a pre-programmed condition is triggered, the smart contract may execute corresponding contract terms.

In some alternative implementations of the present embodiment, the requirement information may further include a resource value corresponding to the to-be-exchanged data, and the first server can enclose a resource corresponding to the to-be-exchanged data. The resource may be a virtual currency, i.e., a digital currency in a P2P (peer-to-peer) form. Peer-to-peer transmission implies a decentralized payment system. The resource value may be a virtual currency amount. Specifically, the second server can further issue the resource value corresponding to the data, while issuing the data identifier. The user can acquire the resource value corresponding to the to-be-exchanged data, while acquiring the to-be-exchanged data identifier. Then, the user can send the requirement information including the to-be-exchanged data identifier and the resource value corresponding to the to-be-exchanged data to the first server. Finally, the first server can analyze the requirement information to extract the resource value corresponding to the to-be-exchanged data therefrom, and enclose the resource corresponding to the to-be-exchanged data. As an example, the first server can enclose the resource corresponding to the to-be-exchanged data in the smart contract acquired from the second server. It should be noted that, before the first server releases the enclosed storage resource, neither the first server nor the second server can operate on the enclosed resource.

Step 202: the first server storing the to-be-exchanged data identifier.

In the present embodiment, the first server can store the to-be-exchanged data identifier based on the to-be-exchanged data identifier acquired in step 201. Here, the first server can store the to-be-exchanged data identifier locally or in a third-party server. Under normal conditions, in order to reduce construction and maintenance costs of the system for data exchange, the first server can store the to-be-exchanged data identifier locally. As an example, the to-be-exchanged data identifier can be stored locally in the first server in a form of text file.

Step 203: the first server acquiring a storage address of the to-be-exchanged data identifier.

In the present embodiment, after the first server stores the to-be-exchanged data identifier, the first server can acquire the storage address of the to-be-exchanged data identifier. The storage address may be a specific storage path of the to-be-exchanged data identifier in the first server.

Step 204: the first server encrypting the storage address of the to-be-exchanged data identifier to generate a first encrypted storage address.

In the present embodiment, the first server can encrypt the storage address of the to-be-exchanged data identifier based on the storage address of the to-be-exchanged data identifier acquired in step 203, to generate the first encrypted storage address.

It should be noted that, the first server can encrypt the storage address of the to-be-exchanged data identifier using various reversible encryption algorithms. The reversible encryption algorithm is a well-known technology widely researched and applied at present, the description of which will not be repeated here.

Step 205: the second server acquiring the first encrypted storage address from the first server.

In the present embodiment, the second server can acquire the first encrypted storage address from the first server based on the first encrypted storage address generated in step 204.

In some alternative implementations of the present embodiment, after generating the first encrypted storage address, the first server can directly send the first encrypted storage address to the second server.

In some alternative implementations of the present embodiment, after generating the first encrypted storage address, the first server can store the first encrypted storage address, and send a storage address of the first encrypted storage address to the second server, such that the second server acquires the first encrypted storage address based on the storage address of the first encrypted storage address. As an example, after generating the first encrypted storage address, the first server can write the first encrypted storage address into the smart contract acquired from the second server, and store the smart contract locally. Then, the first server can send a storage address of the smart contract to the second server. Finally, the second server can acquire the smart contract from the first server based on the storage address of the smart contract, and extract the first encrypted storage address from the smart contract.

Step 206: the second server decrypting the first encrypted storage address to acquire the storage address of the to-be-exchanged data identifier.

In the present embodiment, the second server can decrypt the first encrypted storage address to acquire the storage address of the to-be-exchanged data identifier based on the first encrypted storage address acquired in step 205. Here, the second server can decrypt the first encrypted storage address using a decryption algorithm corresponding to an encryption algorithm encrypting the storage address of the to-be-exchanged data identifier by the first server, to obtain the storage address of the to-be-exchanged data identifier.

Step 207: the second server acquiring the to-be-exchanged data identifier based on the storage address of the to-be-exchanged data identifier.

In the present embodiment, the second server can acquire the to-be-exchanged data identifier from the first server based on the storage address of the to-be-exchanged data identifier acquired in step 206.

Step 208: the second server finding to-be-exchanged data indicated by the to-be-exchanged data identifier from a pre-stored data set based on the to-be-exchanged data identifier.

In the present embodiment, the second server can find the to-be-exchanged data indicated by the to-be-exchanged data identifier from the pre-stored data set based on the to-be-exchanged data identifier acquired in step 207. The data set may include data and a data identifier.

In the present embodiment, the data set can be stored locally in the second server in various ways. For example, the data set can be stored in the second server an a form of text file. As an example, the data set can be stored an the second server in a form of data table. Different rows in the data table have different data indexes, and different columns in the data table have different data names. Here, the to-be-exchanged data identifies may be a to-be-exchanged data index and a to-be-exchanged data name. The second server can first find a row of the to-be-exchanged data in the data table storing the data set based on the to-be-exchanged data index; and then find the to-be-exchanged data in the row of the to-be-exchanged data based on the to-be-exchanged data name.

Step 209: the first server acquiring the to-be-exchanged data from the second server.

In the present embodiment, the first server can acquire the to-be-exchanged data from the second server based on the to-be-exchanged data acquired in step 208.

In some alternative implementations of the present embodiment, after acquiring the to-be-exchanged data, the second server can directly send the to-be-exchanged data to the first server.

In some alternative implementations of the present embodiment, after acquiring the to-be-exchanged data, first, the second server can store the to-be-exchanged data; then the second server can acquire the storage address of the to-be-exchanged data, and encrypt the storage address of the to-be-exchanged data to generate a second encrypted storage address; then the first server can acquire the second encrypted storage address from the second server, and decrypt the second encrypted storage address to acquire the storage address of the to-be-exchanged data; and finally the first server can acquire the to-be-exchanged data from the second server based on the storage address of the to-be-exchanged data. As an example, after generating the second encrypted storage address, first, the second server can write the second encrypted storage address into the smart contract acquired from the first server, and store the smart contract locally. Then, the second server can send the storage address of the smart contract to the first server. Finally, the first server can acquire the smart contract from the second server, and extract the second encrypted storage address from the smart contract.

In some alternative implementations of the present embodiment, the first server can enclose the resource corresponding to the to-be-exchanged data, and release the resource corresponding to the to-be-exchanged data after receiving the to-be-exchanged data sent by the second server, such that the second server acquires the resource corresponding to the to-be-exchanged data. As an example, the first server can enclose the resource corresponding to the to-be-exchanged data into the smart contract acquired from the second server, and can trigger the first server to execute the smart contract having the enclosed resource corresponding to the to-be-exchanged data after receiving the to-be-exchanged data sent by the second server, to implement sending the resource corresponding to the to-be-exchanged data to the second server.

In the system for data exchange provided in the embodiment of the present disclosure, first, a first server acquires a to-be-exchanged data identifier based on requirement information, and stores the to-be-exchanged data identifier; then the first server encrypts a storage address of the to-be-exchanged data identifier to generate a first encrypted storage address; then a second server acquires the first encrypted storage address from the first server, and decrypts the first encrypted storage address to acquire the in storage address of the to-be-exchanged data identifier; then, the second server acquires the to-be-exchanged data identifier based on the storage address of the to-be-exchanged data identifier; and finally the second server finds to-be-exchanged data indicated by the to-be-exchanged data identifier from a pre-stored data set based on the to-be-exchanged data identifier, such that the first server acquires the to-be-exchanged data from the second server. The system for data exchange avoids using a data exchange center by direct peer-to-peer data exchange between the first server and the second server, thereby saving construction and maintenance costs of the system for data exchange.

Figure 3:
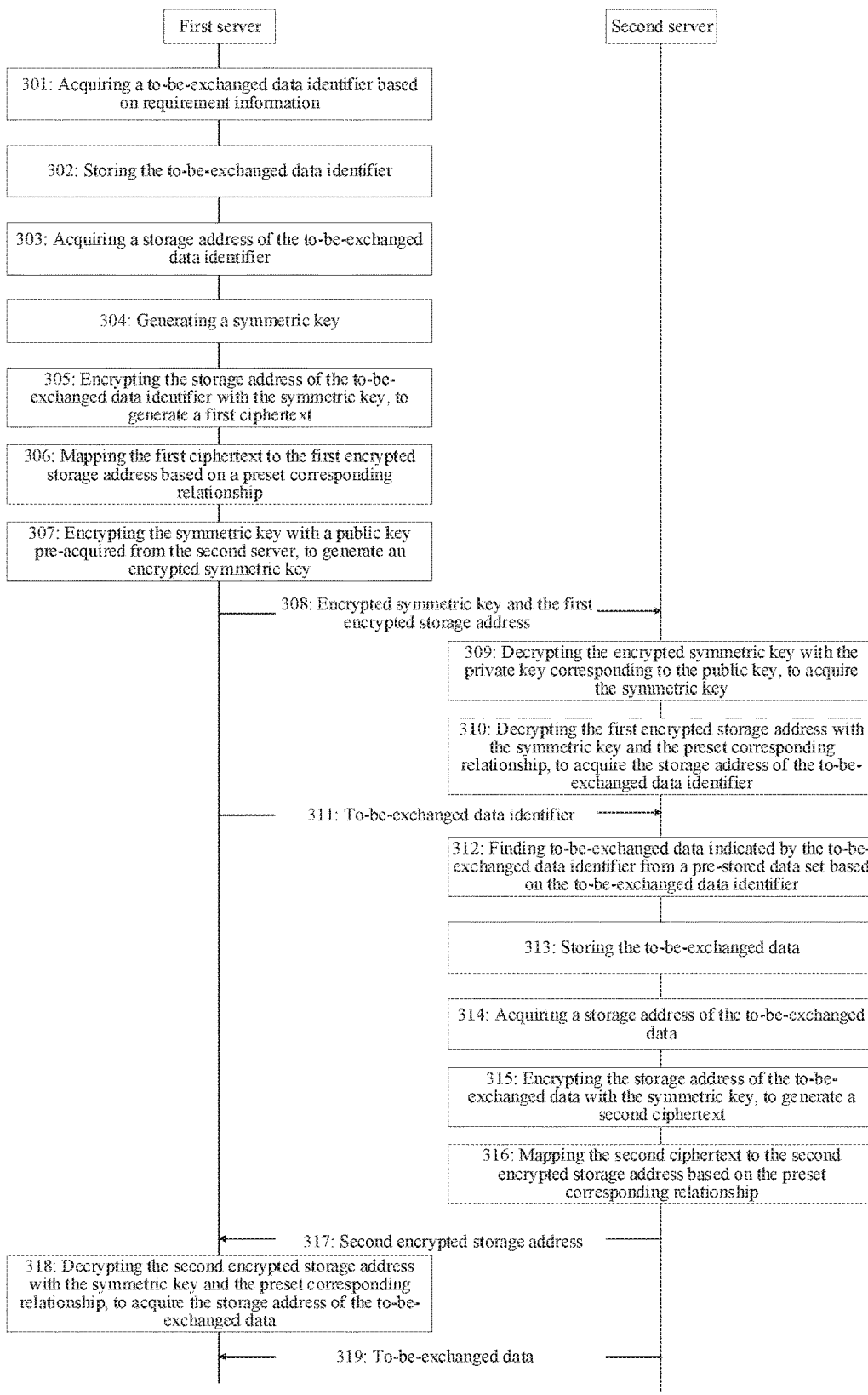
FIG. 3 is a timing sequence diagram of another embodiment of the system for data exchange according to the present disclosure.

Further referring to FIG. 3, a timing sequence 300 of another embodiment of the system for data exchange according to the present disclosure is shown.

The system for data exchange of the present embodiment may include a first server (e.g., the first server 102 shown in FIG. 1) and a second server (e.g., the second server 103 shown in FIG. 1). The first server is configured to acquire a to-be-exchanged data identifier based on requirement information; store the to-be-exchanged data identifier; acquire a storage address of the to-be-exchanged data identifier; generate a symmetric key; encrypt the storage address of the to-be-exchanged data identifier with the symmetric key, to generate a first ciphertext; map the first ciphertext to a first encrypted storage address based on a preset corresponding relationship; and encrypt the symmetric key with a public key pre-acquired from the second server, to generate an encrypted symmetric key, where the second server stores the public key and a private key corresponding to the public key. The second server is configured to acquire the encrypted symmetric key and the first encrypted storage address from the first server; decrypt the encrypted symmetric key with the private key corresponding to the public key, to acquire the symmetric key; decrypt the first encrypted storage address with the symmetric key and the preset corresponding relationship, to acquire the storage address of the to-be-exchanged data identifier; acquire the to-be-exchanged data identifier based on the storage address of the to-be-exchanged data identifier; find to-be-exchanged data indicated by the to-be-exchanged data identifier from a pre-stored data set based on the to-be-exchanged data identifier; acquire the storage address of the to-be-exchanged data; encrypt the storage address of the to-be-exchanged data using the symmetric key, to generate a second ciphertext; and map the second ciphertext to the second encrypted storage address based on the preset corresponding relationship. The first server is further configured to: acquire the second encrypted storage address from the second server; decrypt the second encrypted storage address with the symmetric key and the preset corresponding relationship, to acquire the storage address of the to-be-exchanged data; and acquire the to-be-exchanged data based on the storage address of the to-be-exchanged data.

As shown in FIG. 3, in step 301, the first server acquires a to-be-exchanged data identifier based on requirement information.

In the present embodiment, the first server (e.g., the first server 102 shown in FIG. 1) can acquire the requirement information from a client (e.g., the terminal device 101 shown in FIG. 1) via a wired or wireless connection, and extract the to-be-exchanged data identifier from the requirement information. The requirement information may include the to-be-exchanged data identifier. The data identifier may be comprised of words, letters, numerals, symbols, etc., to uniquely identify data. The to-be-exchanged data identifier can be used to uniquely identify to-be-exchanged data. As an example, the data identifier may include at least one of a data name or a data index.

Step 302: the first server storing the to-be-exchanged data identifier.

In the present embodiment, the first server can store the to-be-exchanged data identifier based on the to-be-exchanged data identifier acquired in step 301. Here, the first server can store the to-be-exchanged data identifier locally or in a third-party server. Under normal conditions, in order to reduce construction and maintenance costs of the system for data exchange, the first server can store the to-be-exchanged data identifier locally. As an example, the to-be-exchanged data identifier can be stored locally in the first server in a form of text file.

Step 303: the first server acquiring a storage address of the to-be-exchanged data identifier.

In the present embodiment, after the first server stores the to-be-exchanged data identifier, the first server can acquire the storage address of the to-be-exchanged data identifier. The storage address may be a specific storage path of the to-be-exchanged data identifier in the first server.

Step 304: the first server generating a symmetric key.

In the present embodiment, the first server can generate the symmetric key. The symmetric key can be configured to encrypt the storage address of the to-be-exchanged data identifier or the storage address of the to-be-exchanged data.

Symmetric key encryption, also known as dedicated key encryption, means that both a data sending end and a data receiving end must perform encryption and decryption operations on a plaintext with the same key. The symmetric key encryption algorithm may include, but is not limited to, DES (Data Encryption Standard), 3DES (Triple Data Encryption Standard), IDEA (International Data Encryption Algorithm), FEAL (Fast Data Encipherment Algorithm), or the like.

Step 305: the first server encrypting the storage address of the to-be-exchanged data identifier with the symmetric key, to generate a first ciphertext.

In the present embodiment, the first server can encrypt the storage address of the to-be-exchanged data identifier with the symmetric key based on the symmetric key generated in step 304, to generate the first ciphertext.

Step 306: the first server mapping the first ciphertext to the first encrypted storage address based on a preset corresponding relationship.

In the present embodiment, the first server can map the first ciphertext to the first encrypted storage address based on the preset corresponding relationship.

In some alternative implementations of the present embodiment, the first server can pre-store a distributed hash table. When the first server inputs the first ciphertext into the distributed hash table, the distributed hash table can map the first ciphertext to the first encrypted storage address based on a corresponding mapping relationship. The distributed hash table is a data structure that corresponds a key to a value in some way. Specifically, the distributed hash table can map a key value to a value, i.e., hash (key)=value, with a function (e.g., a hash function). Thus, a key value can correspond to a certain value. The hash function can convert an input of any length (also referred to as pre-image) into an output of a constant length using a hash algorithm. The output is a hash value.

Step 307: the first server encrypting the symmetric key with a public key pre-acquired from the second server, to generate an encrypted symmetric key.

In the present embodiment, based on the public key pre-acquired from the second server (e.g., the second server 103 shown in FIG. 1), the first server can encrypt the symmetric key with the public key, to generate an encrypted symmetric key. The second server stores the public key and a private key corresponding to the public key, and issues the public key while issuing the data identifier. Specifically, the public key and the private key are a key pair (i.e., a public key and a private key) obtained using an algorithm, the public key is a public part, and the private key is a non-public part of the key pair. The public key is generally configured to encrypt a session key, verify a digital signature, or encrypt data that can be decrypted with a corresponding private key. It can be guaranteed that the key pair obtained using this algorithm is unique worldwide. When this key pair is used, if a piece of data is encrypted with a key of the key pair, then the piece of data must be decrypted with the other key of the key pair. For example, data encrypted with the public key must be decrypted with the private key, and the data encrypted with the private key must be decrypted with the public key, or otherwise, the data will not be successfully decrypted.

Step 308: the second server acquiring the encrypted symmetric key and the first encrypted storage address from the first server.

In the present embodiment, the second server can acquire the first encrypted storage address and the encrypted symmetric key from the first server based on the first encrypted storage address generated in step 306 and the encrypted symmetric key generated in step 307.

In some alternative implementations of the present embodiment, after generating the first encrypted storage address and the encrypted symmetric key, the first server can directly send the first encrypted storage address and the encrypted symmetric key to the second server.

In some alternative implementations of the present embodiment, after generating the first encrypted storage address and the encrypted symmetric key, the first server can store the first encrypted storage address and the encrypted symmetric key, and send a storage address of the first encrypted storage address and the encrypted symmetric key to the second server, such that the second server acquires the first encrypted storage address and the encrypted symmetric key based on the storage address of the first encrypted storage address and the encrypted symmetric key. As an example, after generating the first encrypted storage address and the encrypted symmetric key, first, the first server can write the first encrypted storage address and the encrypted symmetric key into the smart contract acquired from the second server, and store the smart contract locally. Then, the first server can send a storage address of the smart contract to the second server. Finally, the second server can acquire the smart contract from the first server based on the storage address of the smart contract, and extract the first encrypted storage address and the encrypted symmetric key from the smart contract.

Step 309: the second server decrypting the encrypted symmetric key with the private key corresponding to the public key, to acquire the symmetric key.

In the present embodiment, the second server can decrypt the encrypted symmetric key with the private key corresponding to the public key based on the encrypted symmetric key acquired in step 308, to acquire the symmetric key.

Step 310: the second server decrypting the first encrypted storage address with the symmetric key and the preset corresponding relationship, to acquire the storage address of the to-be-exchanged data identifier.

In the present embodiment, the second server can decrypt the first encrypted storage address with the symmetric key and the preset corresponding relationship based on the symmetric key acquired in step 309, to acquire the storage address of the to-be-exchanged data identifier.

In some alternative implementations of the present embodiment, the second server can also pre-store the distributed hash table. Here, when the second server inputs the first encrypted storage address into the distributed hash table, the distributed hash table can map the first encrypted storage address to the first ciphertext based on the corresponding mapping relationship. Then, the second server can decrypt the first ciphertext with the symmetric key, to acquire the storage address of the to-be-exchanged data identifier.

Step 311: the second server acquiring the to-be-exchanged data identifier based on the storage address of the to-be-exchanged data identifier.

In the present embodiment, the second server can acquire the to-be-exchanged data identifier from the first server based on the storage address of the to-be-exchanged data identifier acquired in step 310.

Step 312: the second server finding to-be-exchanged data indicated by the to-be-exchanged data identifier from a pre-stored data set based on the to-be-exchanged data identifier.

In the present embodiment, the second server can find the to-be-exchanged data indicated by the to-be-exchanged data identifier from the pre-stored data set based on the to-be-exchanged data identifier acquired in step 311. The data set may include data and a data identifier.

Step 313: the second server storing the to-be-exchanged data.

In the present embodiment, the second server can store the to-be-exchanged data based on the to-be-exchanged data acquired in step 312. Here, the second server can store the to-be-exchanged data locally or in a third-party server. Under normal conditions, in order to reduce construction and maintenance costs of the system for data exchange, the second server can store the to-be-exchanged data locally. As an example, the to-be-exchanged data can be stored locally in the second server in a form of text file.

Step 314: the second server acquiring a storage address of the to-be-exchanged data.

In the present embodiment, after the second server stores the to-be-exchanged data, the second server can acquire the storage address of the to-be-exchanged data. The storage address may be a specific storage path of the to-be-exchanged data in the second server.

Step 315: the second server encrypting the storage address of the to-be-exchanged data with the symmetric key, to generate a second ciphertext.

In the present embodiment, the second server can encrypt the storage address of the to-be-exchanged data with the symmetric key based on the symmetric key generated in step 309, to generate the second ciphertext.

Step 316: the second server mapping the second ciphertext to the second encrypted storage address based on the preset corresponding relationship.

In the present embodiment, the second server can map the second ciphertext to the second encrypted storage address based on the preset corresponding relationship.

Step 317: the first server acquiring the second encrypted storage address from the second server.

In the present embodiment, the first server can acquire the second encrypted storage address from the second server based on the second encrypted storage address generated in step 316.

Step 318: the first server decrypting the second encrypted storage address with the symmetric key and the preset corresponding relationship, to acquire the storage address of the to-be-exchanged data.

In the present embodiment, the first server can decrypt the second encrypted storage address with the symmetric key and the preset corresponding relationship based on the second encrypted storage address acquired in step 317, to acquire the storage address of the to-be-exchanged data. As an example, the first server can first input the second encrypted storage address into the distributed hash table, to acquire the second ciphertext; and then decrypt the second ciphertext with the symmetric key, to acquire the storage address of the to-be-exchanged data.

Step 319: the first server acquiring the to-be-exchanged data based on the storage address of the to-be-exchanged data.

In the present embodiment, the first server can acquire the to-be-exchanged data from the second server based on the to-be-exchanged data acquired in step 318.

As can be seen from FIG. 3, compared with the embodiment corresponding to FIG. 2, the timing sequence 300 of the system for data exchange in the present embodiment highlights the encryption and decryption steps with the public key, the private key, and the symmetric key. Thus, the system for data exchange can perform data exchange more safely and reliably.

Figure 4:
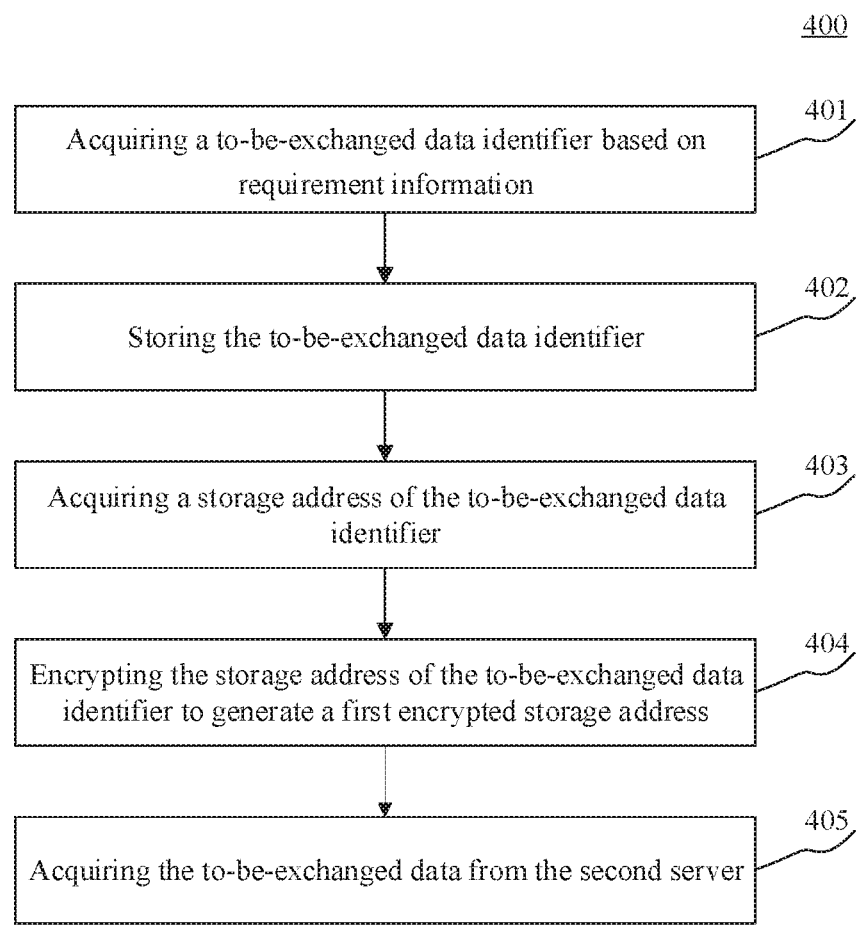
FIG. 4 is a flowchart of an embodiment of a method for data exchange for a first server according to the present disclosure.

Further referring to FIG. 4, a process 400 of an embodiment of a method for data exchange for a first server according to the present disclosure is shown. The process 400 of the method for data exchange for the first server includes the following steps.

Step 401: acquiring a to-be-exchanged data identifier based on requirement information.

In the present embodiment, the first server (e.g., the first server 102 shown in FIG. 1) can acquire the requirement information from a client (e.g., the terminal device 101 shown in FIG. 1) via a wired or wireless connection, and extract the to-be-exchanged data identifier from the requirement information. The requirement information may include the to-be-exchanged data identifier. The data identifier may be comprised of words, letters, numerals, symbols, etc., to uniquely identify data. The to-be-exchanged data identifier can be used to uniquely identify to-be-exchanged data. As an example, the data identifier may include at least one of a data name or a data index.

Step 402: storing the to-be-exchanged data identifier.

In the present embodiment, the first server can store the to-be-exchanged data identifier based on the to-be-exchanged data identifier acquired in step 401. Here, the first server can store the to-be-exchanged data identifier locally or in a third-party server. Under normal conditions, in order to reduce construction and maintenance costs of the system for data exchange, the first server can store the to-be-exchanged data identifier locally. As an example, the to-be-exchanged data identifier can be stored locally in the first server in a form of text file.

Step 403: acquiring a storage address of the to-be-exchanged data identifier.

In the present embodiment, after the first server stores the to-be-exchanged data identifier, the first server can acquire the storage address of the to-be-exchanged data identifier. The storage address may be a specific storage path of the to-be-exchanged data identifier in the first server.

Step 404: encrypting the storage address of the to-be-exchanged data identifier to generate a first encrypted storage address.

In the present embodiment, the first server can encrypt the storage address of the to-be-exchanged data identifier to generate the first encrypted storage address based on the storage address of the to-be-exchanged data identifier acquired in step 403, such that the second server (e.g., the server 103 shown in FIG. 1) acquires the first encrypted storage address from the first server, decrypts the first encrypted storage address to acquire the storage address of the to-be-exchanged data identifier, acquires the to-be-exchanged data identifier based on the storage address of the to-be-exchanged data identifier, and finds to-be-exchanged data indicated by the to-be-exchanged data identifier from a pre-stored data set based on the to-be-exchanged data identifier, the data set including data and a data identifier.

Step 405: acquiring the to-be-exchanged data from the second server.

In the present embodiment, after the second server finds the to-be-exchanged data indicated by the to-be-exchanged data identifier from the pre-stored data set, the first server can acquire the to-be-exchanged data from the second server.

In the method for data exchange for a first server provided in the embodiment of the present disclosure, first, a to-be-exchanged data identifier based on requirement information is acquired, and the to-be-exchanged data identifier is stored; then a storage address of the to-be-exchanged data identifier is encrypted to generate a first encrypted storage address, such that a second server acquires the first encrypted storage address from the first server, decrypts the first encrypted storage address to acquire the storage address of the to-be-exchanged data identifier, acquires the to-be-exchanged data identifier, acquires the to-be-exchanged data identifier based on the storage address of the to-be-exchanged data identifier, and finds to-be-exchanged data indicated by the to-be-exchanged data identifier from a pre-stored data set based on the to-be-exchanged data identifier; and finally, the to-be-exchanged data is acquired from the second server after the second server finds the to-be-exchanged data. A data exchange center is not required to be involved in the whole process of data exchange because of direct peer-to-peer data exchange between the first server and the second server, thereby saving construction and maintenance costs of the system for data exchange.

Figure 5:
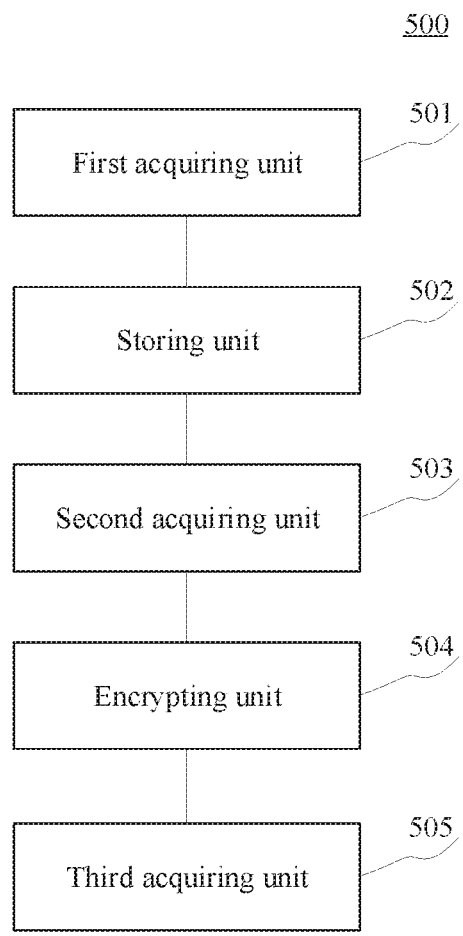
FIG. 5 is a schematic structural diagram of an embodiment of an apparatus for data exchange for a first server according to the present disclosure.

Further referring to FIG. 5, as an implementation of the method shown in the above FIG. 4, the present disclosure provides an embodiment of an apparatus for data exchange for a first server. The embodiment of the apparatus corresponds to the embodiment of the method shown in FIG. 4, and the apparatus may be specifically applied to various electronic devices.

As shown in FIG. 5, the apparatus 500 for data exchange for a first server shown in the present embodiment may include: a first acquiring unit 501, a storing unit 502, a second acquiring unit 503, an encrypting unit 504, and a third acquiring unit 505. The first acquiring unit 501 is configured to acquire a to-be-exchanged data identifier based on requirement information; the storing unit 502 is configured to store the to-be-exchanged data identifier; the second acquiring unit 503 is configured to acquire a storage address of the to-be-exchanged data identifier; the encrypting unit 504 is configured to encrypt the storage address of the to-be-exchanged data identifier to generate a first encrypted storage address, such that a second server acquires the first encrypted storage address from the first server, decrypts the first encrypted storage address to acquire the storage address of the to-be-exchanged data identifier, acquires the to-be-exchanged data identifier based on the storage address of the to-be-exchanged data identifier, and finds to-be-exchanged data indicated by the to-be-exchanged data identifier from a pre-stored data set based on the to-be-exchanged data identifier, the data set including data and a data identifier; and the third acquiring unit 505 is configured to acquire the to-be-exchanged data from the second server.

In the present embodiment, the specific processing of the first acquiring unit 501, the storing unit 502, the second acquiring unit 503, the encrypting unit 504, and the third acquiring unit 505 of the apparatus 500 for data exchange for a first server and the technical effects thereof may be referred to the related description in step 401, step 402, and step 403, step 404, and step 405 in the corresponding embodiment of FIG. 4, respectively. The description will not be repeated here.

Figure 6:
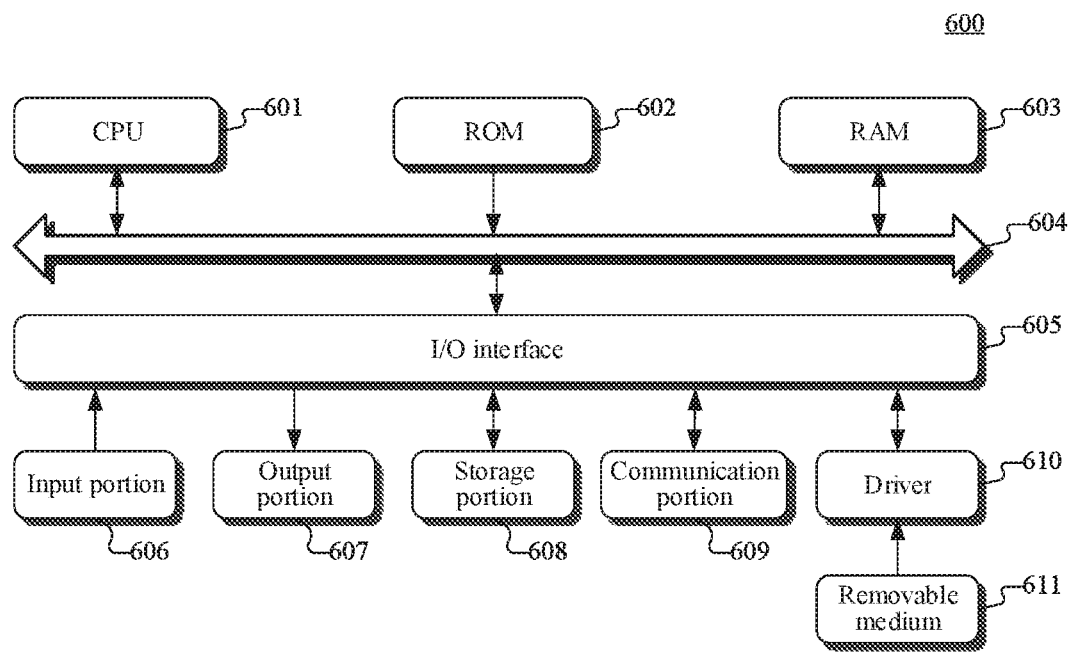
FIG. 6 is a schematic structural diagram of a computer system adapted to implement a server of embodiments of the present disclosure.

Referring to FIG. 6 below, a schematic structural diagram of a computer system 600 adapted to implement a server of embodiments of the present disclosure is shown. The server shown in FIG. 6 is merely an example, and should not limit the functions and scope of use of the embodiments of the present disclosure.

As shown in FIG. 6, the computer system 600 includes a central processing unit (CPU) 601, which may execute various appropriate actions and processes in accordance with a program stored in a read only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, or the like; an output portion 607 including a cathode ray tube (CRT), a liquid crystal display device (LCD), a speaker, or the like; a storage portion 608 including a hard disk, or the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, so that a computer program read therefrom is installed on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a computer readable medium. The computer program includes program codes for executing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above functions as defined by the method of the present disclosure.

It should be noted that the computer readable medium may be a computer readable signal medium or a computer readable storage medium or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: electrical connection with one or more wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the present disclosure, the computer readable storage medium may be any tangible medium containing or storing programs, which may be used by a command execution system, apparatus or element, or incorporated thereto. In the present disclosure, the computer readable signal medium may include a data signal in the base band or propagating as a part of a carrier wave, in which computer readable program codes are carried. The propagating data signal may take various forms, including but not limited to: an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure this regard, each of the blocks in the flow charts or block diagrams may represent a module, a program segment, or a code portion, said module, program segment, or code portion comprising one or more executable instructions for implementing specified logical functions. It should be further noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor, including a first acquiring unit, a storing unit, a second acquiring unit, an encrypting unit, and a third acquiring unit. The names of the units do not constitute a limitation to such units themselves in some cases. For example, the first acquiring unit may be further described as "a unit configured to acquire a to-be-exchanged data identifier based on requirement information."

In another aspect, the present disclosure further provides a computer readable medium. The computer readable medium may be included in the server in the above described embodiments, or a stand-alone computer readable medium without being assembled into the server. The above computer readable medium stores one or more programs. The one or more programs, when executed by the server, cause the server to: acquire a to-be-exchanged data identifier based on requirement information; store the to-be-exchanged data identifier; acquire a storage address of the to-be-exchanged data identifier; encrypt the storage address of the to-be-exchanged data identifier to generate a first encrypted storage address, such that a second server acquires the first encrypted storage address from a first server, decrypts the first encrypted storage address to acquire the storage address of the to-be-exchanged data identifier, acquires the to-be-exchanged data identifier based on the storage address of the to-be-exchanged data identifier, and finds to-be-exchanged data indicated by the to-be-exchanged data identifier from a pre-stored data set based on the to-be-exchanged data identifier, the data set including data and a data identifier; and acquire the to-be-exchanged data from the second server.

The above description only provides explanation of the preferred embodiments of the present disclosure and the employed technical principles. It should be appreciated by those skilled in the art that the inventive scope of the present disclosure is not limited to the technical solutions formed by the particular combinations or the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

What is claimed is:

1. A system for data exchange, comprising: a first server including a first hardware processor and a second server including a second hardware processor;
   the first server being configured to acquire, from a smart contract issued by the second server, a to-be-exchanged data identifier based on requirement information, the to-be-exchanged data identifier being wrote into the smart contract by the second server; store the to-be-exchanged data identifier locally; acquire a storage address of the to-be-exchanged data identifier; and encrypt the storage address of the to-be-exchanged data identifier to generate a first encrypted storage address; write the first encrypted storage address into the smart contract acquired from the second server, and locally store the smart contract containing the first encrypted storage address to obtain a storage address of the smart contract; send the storage address of the smart contract to the second server; and
   the second server being configured to acquire smart contract stored on the first server based on the storage address of the smart contract received from the first server; acquire the first encrypted storage address from the acquired smart contract; decrypt the first encrypted storage address to acquire the storage address of the to-be-exchanged data identifier; acquire the to-be-exchanged data identifier based on the storage address of the to-be-exchanged data identifier; and find to-be-exchanged data indicated by the to-be-exchanged data identifier from a pre-stored data set on the second server based on the to-be-exchanged data identifier, such that the first server acquires the to-be-exchanged data from the second server, the data set including data and a data identifier.

2. The system according to claim 1, wherein the second server is further configured to:
   store the to-be-exchanged data locally;
   acquire a storage address of the to-be-exchanged data; and
   encrypt the storage address of the to-be-exchanged data to generate a second encrypted storage address;
   write the second encrypted storage address into the smart contract acquired from the first server, and locally store the smart contract containing the second encrypted storage address to obtain a storage address of the smart contract containing the second encrypted storage address;
   send the storage address of the smart contract containing the second encrypted storage address to the first server, and
   the first server is further configured to:
   acquire the smart contract containing the second encrypted storage address from the second server based on the storage address of the smart contract containing the second encrypted storage address;
   acquire the second encrypted storage address from the acquired smart contract;
   decrypt the second encrypted storage address to acquire the storage address of the to-be-exchanged data; and
   acquire the to-be-exchanged data based on the storage address of the to-be-exchanged data.

3. The system according to claim 2, wherein the first server is further configured to:
   generate a symmetric key;
   encrypt the storage address of the to-be-exchanged data identifier with the symmetric key, to generate a first ciphertext; and
   map the first ciphertext to the first encrypted storage address based on a preset corresponding relationship.

4. The system according to claim 3, wherein the first server is further configured to:
   encrypt the symmetric key with a public key pre-acquired from the second server, to generate an encrypted symmetric key, wherein the second server stores the public key and a private key corresponding to the public key.

5. The system according to claim 4, wherein the second server is further configured to:
   acquire the encrypted symmetric key and the first encrypted storage address from the first server;
   decrypt the encrypted symmetric key with the private key corresponding to the public key, to acquire the symmetric key; and
   decrypt the first encrypted storage address with the symmetric key and the preset corresponding relationship, to acquire the storage address of the to-be-exchanged data identifier.

6. The system according to claim 5, wherein the second server is further configured to:
   encrypt the storage address of the to-be-exchanged data with the symmetric key, to generate a second ciphertext; and
   map the second ciphertext to the second encrypted storage address based on the preset corresponding relationship.

7. The system according to claim 6, wherein the first server is further configured to:
   acquire the second encrypted storage address from the second server;
   decrypt the second encrypted storage address with the symmetric key and the preset corresponding relationship, to acquire the storage address of the to-be-exchanged data; and
   acquire the to-be-exchanged data based on the storage address of the to-be-exchanged data.

8. The system according to claim 1, wherein the first server is further configured to:
   enclose a resource corresponding to the to-be-exchanged data; and
   release the resource corresponding to the to-be-exchanged data after receiving the to-be-exchanged data sent by the second server, such that the second server acquires the resource corresponding to the to-be-exchanged data.

9. The system according to claim 1, wherein the system for data exchange avoids using a data exchange center by direct peer-to-peer data exchange between the first server and the second server.

10. A method for data exchange for a first server, comprising:
    acquiring, from a smart contract issued by a second server, a to-be-exchanged data identifier based on requirement information, the to-be-exchanged data identifier being wrote into the smart contract by the second server;
    storing the to-be-exchanged data identifier locally;
    acquiring a storage address of the to-be-exchanged data identifier;
    encrypting the storage address of the to-be-exchanged data identifier to generate a first encrypted storage address;

writing the first encrypted storage address into the smart contract acquired from the second server, and locally storing the smart contract containing the first encrypted storage address to obtain a storage address of the smart contract;

sending the storage address of the smart contract to the second server, such that the second server acquires the smart contract stored on the first server based on the storage address of the smart contract received from the first server, and acquires the first encrypted storage address from the acquired smart contract, decrypts the first encrypted storage address to acquire the storage address of the to-be-exchanged data identifier, acquires the to-be-exchanged data identifier based on the storage address of the to-be-exchanged data identifier, and finds to-be-exchanged data indicated by the to-be-exchanged data identifier from a pre-stored data set on the second server based on the to-be-exchanged data identifier, the data set including data and a data identifier; and acquiring the to-be-exchanged data from the second server.

11. The method according to claim 10, wherein the encrypting the storage address of the to-be-exchanged data identifier to generate a first encrypted storage address comprises:

generating a symmetric key;

encrypting the storage address of the to-be-exchanged data identifier with the symmetric key, to generate a first ciphertext; and mapping the first ciphertext to the first encrypted storage address based on a preset corresponding relationship.

12. The method according to claim 11, wherein the method further comprises:

encrypting the symmetric key with a public key pre-acquired from the second server, to generate an encrypted symmetric key, wherein the second server stores the public key and a private key corresponding to the public key.

13. The method according to claim 11, wherein the acquiring the to-be-exchanged data from the second server comprises:

acquiring a second encrypted storage address from the second server;

decrypting the second encrypted storage address with the symmetric key and the preset corresponding relationship, to acquire a storage address of the to-be-exchanged data; and acquiring the to-be-exchanged data based on the storage address of the to-be-exchanged data.

14. The method according to claim 10, wherein the method further comprises:

enclosing a resource corresponding to the to-be-exchanged data; and releasing the resource corresponding to the to-be-exchanged data after receiving the to-be-exchanged data sent by the second server, such that the second server acquires the resource corresponding to the to-be-exchanged data.

15. An apparatus for data exchange for a first server, comprising:

at least one processor; and a memory storing instructions, the instructions when executed by the at least one processor, cause the at least one processor to perform operations, the operations comprising:

acquiring, from a smart contract issued by a second server, a to-be-exchanged data identifier based on requirement information, the to-be-exchanged data identifier being wrote into the smart contract by the second server;

storing the to-be-exchanged data identifier locally;

acquiring a storage address of the to-be-exchanged data identifier;

encrypting the storage address of the to-be-exchanged data identifier to generate a first encrypted storage address;

writing the first encrypted storage address into the smart contract acquired from the second server, and locally storing the smart contract containing the first encrypted storage address to obtain a storage address of the smart contract;

sending the storage address of the smart contract to the second server, such that the second server acquires the smart contract stored on the first server based on the storage address of the smart contract received from the first server, and acquires the first encrypted storage address from the acquired smart contract, decrypts the first encrypted storage address to acquire the storage address of the to-be-exchanged data identifier, acquires the to-be-exchanged data identifier based on the storage address of the to-be-exchanged data identifier, and finds to-be-exchanged data indicated by the to-be-exchanged data identifier from a pre-stored data set on the second server based on the to-be-exchanged data identifier, the data set including data and a data identifier; and acquiring the to-be-exchanged data from the second server.

16. The apparatus according to claim 15, wherein the encrypting the storage address of the to-be-exchanged data identifier to generate a first encrypted storage address comprises:

generating a symmetric key;

encrypting the storage address of the to-be-exchanged data identifier with the symmetric key, to generate a first ciphertext; and mapping the first ciphertext to the first encrypted storage address based on a preset corresponding relationship.

17. The apparatus according to claim 16, wherein the operations further comprise:

encrypting the symmetric key with a public key pre-acquired from the second server, to generate an encrypted symmetric key, wherein the second server stores the public key and a private key corresponding to the public key.

18. The apparatus according to claim 16, wherein the acquiring the to-be-exchanged data from the second server comprises:

acquiring a second encrypted storage address from the second server;

decrypting the second encrypted storage address with the symmetric key and the preset corresponding relationship, to acquire a storage address of the to-be-exchanged data; and acquiring the to-be-exchanged data based on the storage address of the to-be-exchanged data.

19. The apparatus according to claim 15, wherein the operations further comprise:

enclosing a resource corresponding to the to-be-exchanged data; and releasing the resource corresponding to the to-be-exchanged data after receiving the to-be-exchanged data sent by the second server, such that the second server acquires the resource corresponding to the to-be-exchanged data.

20. A non-transitory computer readable storage medium, storing a computer program thereon, wherein the computer program, when executed by a processor, causes the processor to implement operations, the operations comprising:
- acquiring, from a smart contract issued by a second server, a to-be-exchanged data identifier based on requirement information, the to-be-exchanged data identifier being wrote into the smart contract by the second server;
- storing the to-be-exchanged data identifier locally;
- acquiring a storage address of the to-be-exchanged data identifier;
- encrypting the storage address of the to-be-exchanged data identifier to generate a first encrypted storage address;
- writing the first encrypted storage address into the smart contract acquired from the second server, and locally storing the smart contract containing the first encrypted storage address to obtain a storage address of the smart contract;
- sending the storage address of the smart contract to the second server, such that the second server acquires the smart contract stored on the first server based on the storage address of the smart contract received from the first server, and acquires the first encrypted storage address from the acquired smart contract, decrypts the first encrypted storage address to acquire the storage address of the to-be-exchanged data identifier, acquires the to-be-exchanged data identifier based on the storage address of the to-be-exchanged data identifier, and finds to-be-exchanged data indicated by the to-be-exchanged data identifier from a pre-stored data set on the second server based on the to-be-exchanged data identifier, the data set including data and a data identifier; and
- acquiring the to-be-exchanged data from the second server.

* * * * *